United States Patent [19]

Ainoura

[11] 4,009,636
[45] Mar. 1, 1977

[54] HOBBING MACHINE

[76] Inventor: Masato Ainoura, 1253 Eguchi, Kita-Shigeyasu-cho, Miyaki, Saga, Japan

[22] Filed: Oct. 8, 1975

[21] Appl. No.: 620,784

[30] Foreign Application Priority Data

Oct. 19, 1974 Japan ............................. 49-120675

[52] U.S. Cl. ................................... 90/4; 51/95 GH
[51] Int. Cl.² .......................................... B23F 11/00
[58] Field of Search ........................ 90/4; 51/95 GH

[56] References Cited

UNITED STATES PATENTS

| | | | |
|---|---|---|---|
| 2,385,650 | 9/1945 | Rickenmann | 51/95 GH X |
| 2,607,175 | 8/1952 | Osplack | 51/95 GH X |
| 2,850,948 | 9/1958 | James | 90/4 |
| 2,893,173 | 7/1959 | Bateman | 90/4 X |
| 2,898,707 | 8/1959 | Rickenmann | 90/4 X |
| 3,561,321 | 2/1971 | Belshaw et al. | 90/4 |

Primary Examiner—Francis S. Husar
Assistant Examiner—W. R. Briggs
Attorney, Agent, or Firm—George B. Oujevolk

[57] ABSTRACT

A hobbing machine comprises a tool support member operably provided on a machine frame and having a tool support shaft, a workpiece support member operably provided on a machine frame and serving to support a workpiece and a tool mounted on a tool support shaft and serving to cut the outer periphery of a workpiece. A drive motor is provided on the tool support member in the neighborhood of the tool and has a motor shaft coaxial with the tool support shaft. A coupling providing shock absorbing effect is provided between the motor shaft and tool support shaft, whereby the tool in directly driven by the motor.

6 Claims, 13 Drawing Figures

HOBBING MACHINE

This invention relates to machine tools and, more particularly, a hobbing machine used for cutting gears.

The hobbing machines of the prior art fall into one of two types, namely vertical type having a vertical support shaft supporting the workpiece and horizontal type having a horizontal support shaft. Also, they are classed into two types in regard of the adjustment of the distance between tool, i.e., hob, and workpiece, namely on where a table supporting the workpiece is moved and one where a column supporting the hob is moved. In either hobbing machine the drive power of an electric motor provided on the machine frame is transmitted to the hob through a transmission gear mechanism provided between the motor and hob and consisting of a number of gears, and during the hobbing operation various troubles are likely to result from twisting of transmission shafts and back-lash of gears in the transmission gear mechanism.

With the twisting of transmission shafts or back-lash of gears that take place during the hobbing of workpiece the hob shaft which is most remote from the drive source, i.e., electric motor, is likely to undergo rotational vibration, causing variations of force applied to the workpiece by the cutting blade of the hob. Therefore, the edge of the cutting blade is liable to be broken in an unit of one hundredth of a millimeter or subject to early wear due to such mechanical causes as compressive or tensile strain developed in the edge or impact of the edge, thus leading to rough gear surface of the eventual gear. Although the breakage of the edge of the cutting blade is sometimes caused by thermal distortion due to sudden temperature changes in the cutting section, it is mostly based on the afore-mentioned rotational vibration of the hob shaft. Therefore the number of gears that can be continuously produced with the same hob is extremely restricted, and also it is extremely difficult to use a super-hard hob made of a hard material. Particularly, a super-hard hob made of high speed steel containing about 8 percent of cobalt is readily prone to breakage. In addition, the aforementioned twisting of the transmission shafts that is produced in the hobbing operation disappears when the cutting blade of the hob having completed the cutting of a predetermined tooth in the workpiece gets out thereof, at which time the cutting force is suddenly reduced, thus resulting in bending of the tooth face of the workpiece being cut, that is, eventual gear. Therefore, it has been impossible to produce a gear with high precision or hob a gear of large module. Particularly, with multithread hobs such as three-thread and five-thread ones the being of the tooth face is pronounced because in these cases the workpiece is rotated at comparatively high speed.

It is accordingly a primary object of this invention to provide a hobbing machine, which uses no transmission gears between drive source and hob and is thus free from twisting of transmission shafts or back-lash of gears, thus permitting to produce a large number of gears with the same hob with less breakage and wear of the cutting blade of the hob and also use super-hard hobs for cutting various types of gears.

Another object of the invention is to provide a hobbing machine, with which the tooth face of the workpiece being cut is not bent, and which thus permits to produce gears with high precision and cut gears of large modules.

A further object of the invention is to provide a hobbing machine, in which large shock loaded on the cutting blade of the hob at the instant of start of deep feeding of the blade into the workpiece is absorbed, and which thus ensures less breakage or wear of the hob and quiet cutting operation.

The above and further objects, features and advantages of the invention will become more apparent from the following description taken in conjunction with the accompanying drawings, in which.

Figure 1:
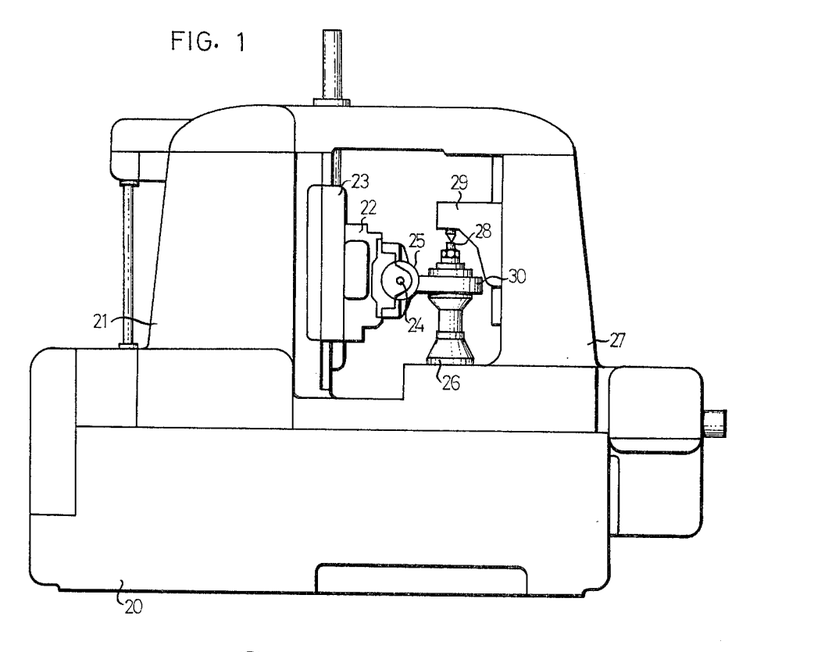
FIG. 1 is an elevational view showing an ordinary vertical hobbing machine of movable table type.

FIG. 1 shows an example of the vertical hobbing machine of movable table type. The machine frame of this hobbing machine comprises a bed 20 and a column 21, and within the column 21 a tool support member, i.e., a hob head 22 is provided via a hob saddle 23 such that it is vertically movable and rotatable. A tool support shaft, i.e., a hob shaft 24 is rotatably supported in a side portion of the hob head 22, and a hob 25 is mounted on the hob shaft 24. On top of the bed 20 a workpiece support member, i.e., a table 26 is provided via a table saddle 27 such that it is movable in a horizontal direction. A workpiece support shaft 28 vertically extends between the table 26 and a support arm 29, and a workpiece, i.e., an eventual gear element 30 is mounted on the support shaft 28.

Figure 2:
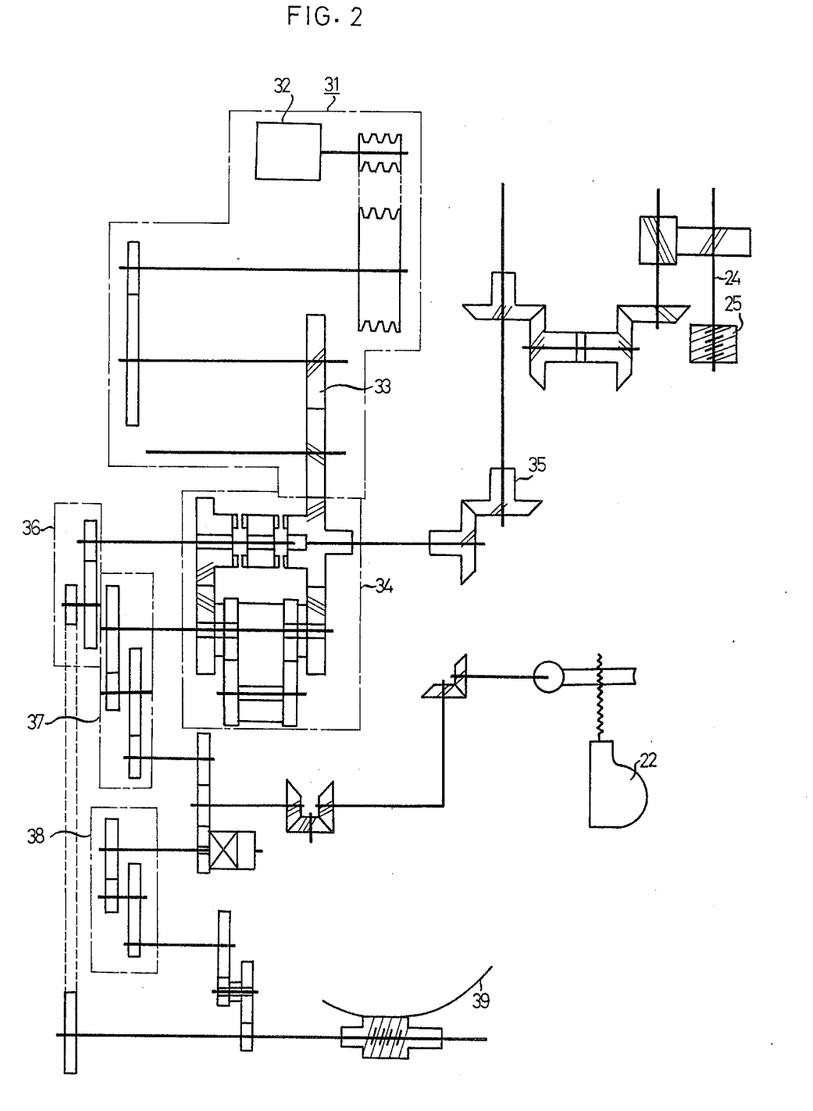
FIG. 2 is a schematic representation of a power transmitting system in the prior-art hobbing machine.
Figure 3:
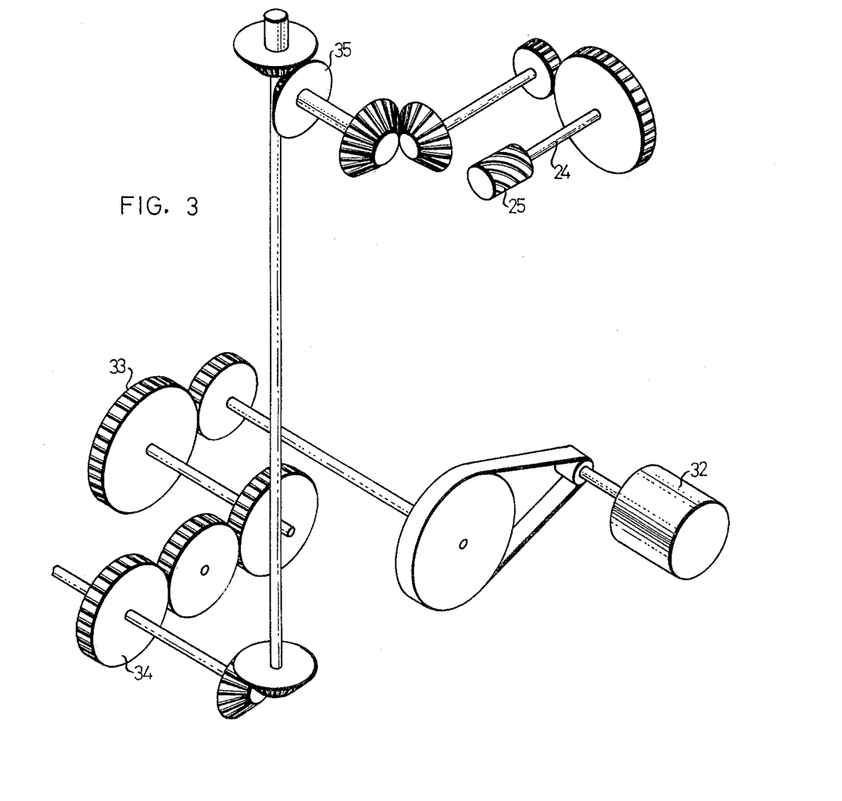
FIG. 3 is a perspective view to an enlarged scale showing part of the same power transmitting system.

In this type of hobbing machine, a driving means 31 consisting of an electric motor 32 and transmitting gear means 33 is provided in association with a differential gear mechanism 34, as shown in FIG. 2. The rotation of the electric motor 32 is transmited through the transmitting gear means 33 to the differential gear mechanism 34, and thence through a transmission gear train 35 to the hob shaft 24 for rotating the hob 25. The differential gear mechanism 34 is also coupled to an index change gear mechanism 36, a differential change gear mechanism 37 and a feed change gear mechanism 38, with these gear mechanisms 36, 37 and 38 serving to rotate a worm wheel 39 provided on the workpiece support shaft 28 while moving the hob head 22 for cutting the workpiece 30 supported on the workpiece support shaft 28 with the hob 25. In this prior-art hobbing machine, the transmitting gear trains 33 and 35 between the electric motor 32 and hob shaft 24 comprise a number of transmission shafts and gears as shown in FIG. 3, so that the twisting of the transmission shafts and back-lash of the gears during the hobbing of the workpiece 30 are prone, resulting in many troubles such as breakage of the cutting blade of the hob 25 and the face advance of the eventual gear.

Figure 4:
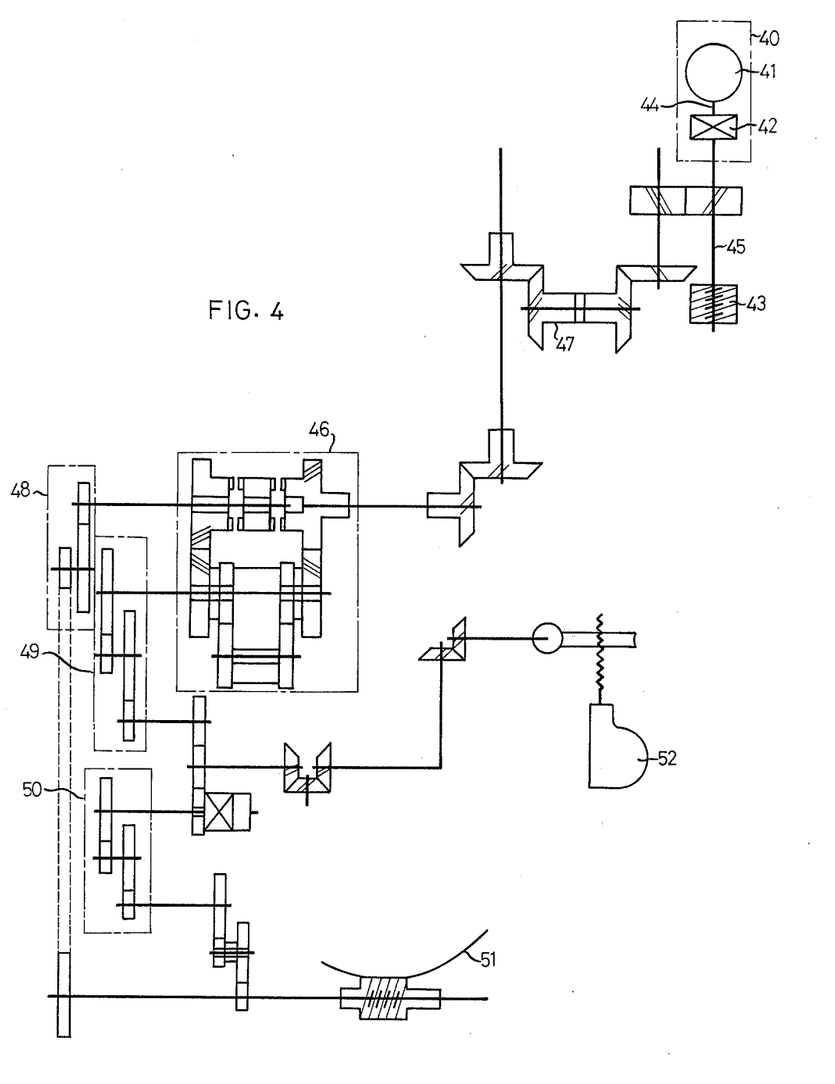
FIG. 4 is a schematic representation of a power transmitting system in a hobbing machine according to the invention.

In the hobbing machine according to the invention, transmission gears between the drive source and hob shaft are omitted. According to the invention, a drive means 40 consisting of an oil pressure motor 41 and a coupling 42 which also serves as shock absorber is provided in the vicinity of hob 43, as shown in FIG. 4. Both motor shaft 44 and hob shaft 45 are coaxially coupled together via the coupling 42, whereby the hob 43 is directly driven by the oil pressure motor 41. The drive means 40 is also coupled to a differential gear mechanism 46 through transmission gear means 47, and the differential gear mechanism 46 is cupled to index change gear mechanism 48, differential change gear mechanism 49 and feed change gear mechanism 50, whereby the rotation of the oil pressure motor 41 in the drive means 40 is transmitted through the gear mechanisms 48, 49 and 50 for rotating worm wheel 51 mounted on the workpiece support shaft while moving hob head 52 to thereby hob the workpiece supported on the workpiece support shaft with the hob 43. The hobbing machine according to the invention is characterized in that the oil pressure 51 is used as the drive source, that no transmission gears are provided between oil pressure motor 41 and hob shaft 45 and that the power of the oil pressure motor 41 is transmitted to the hob 43 via the coupling 42, as is clearly shown in FIG. 5. Thus, such adverse effects as twisting of transmission shafts and back-lash of gears during the hobbing of the workpiece are eliminated to permit satisfactory hobbing operation.

Figures 5, 6:
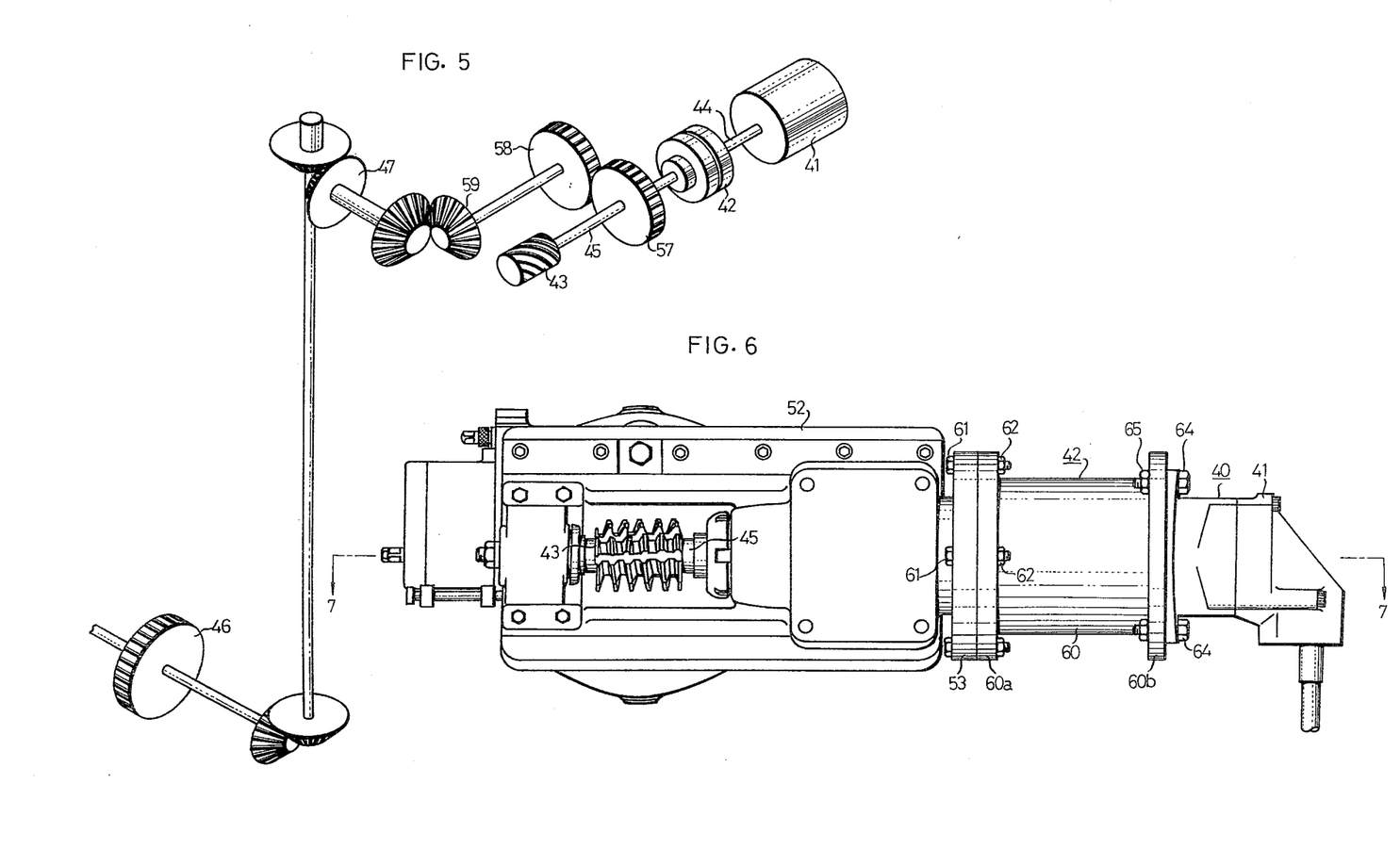
FIG. 5 is a perspective view to an enlarged scale showing part of the same power transmitting system.
FIG. 6 is a side view showing a tool support mechanism in the hobbing machine according to the invention.
Figure 7A:
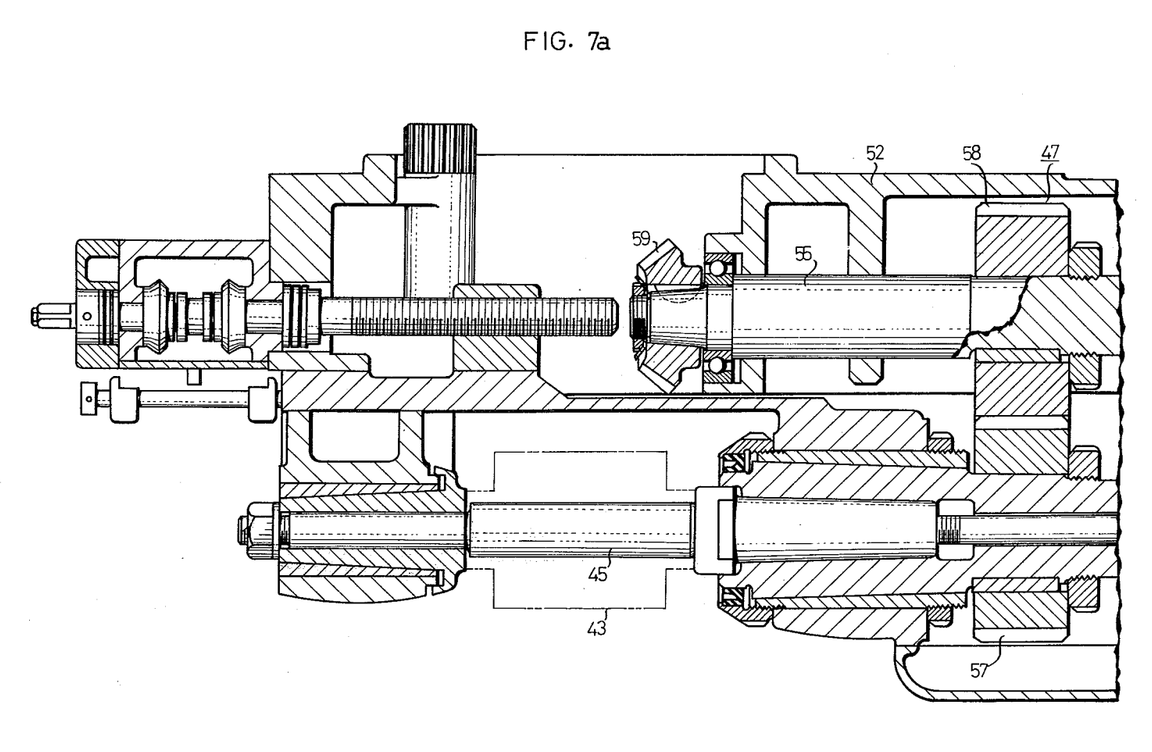
FIG. 7a and FIG. 7b are sections to an enlarged scale taken along line 7—7 in FIG. 6.
Figures 7B, 8:
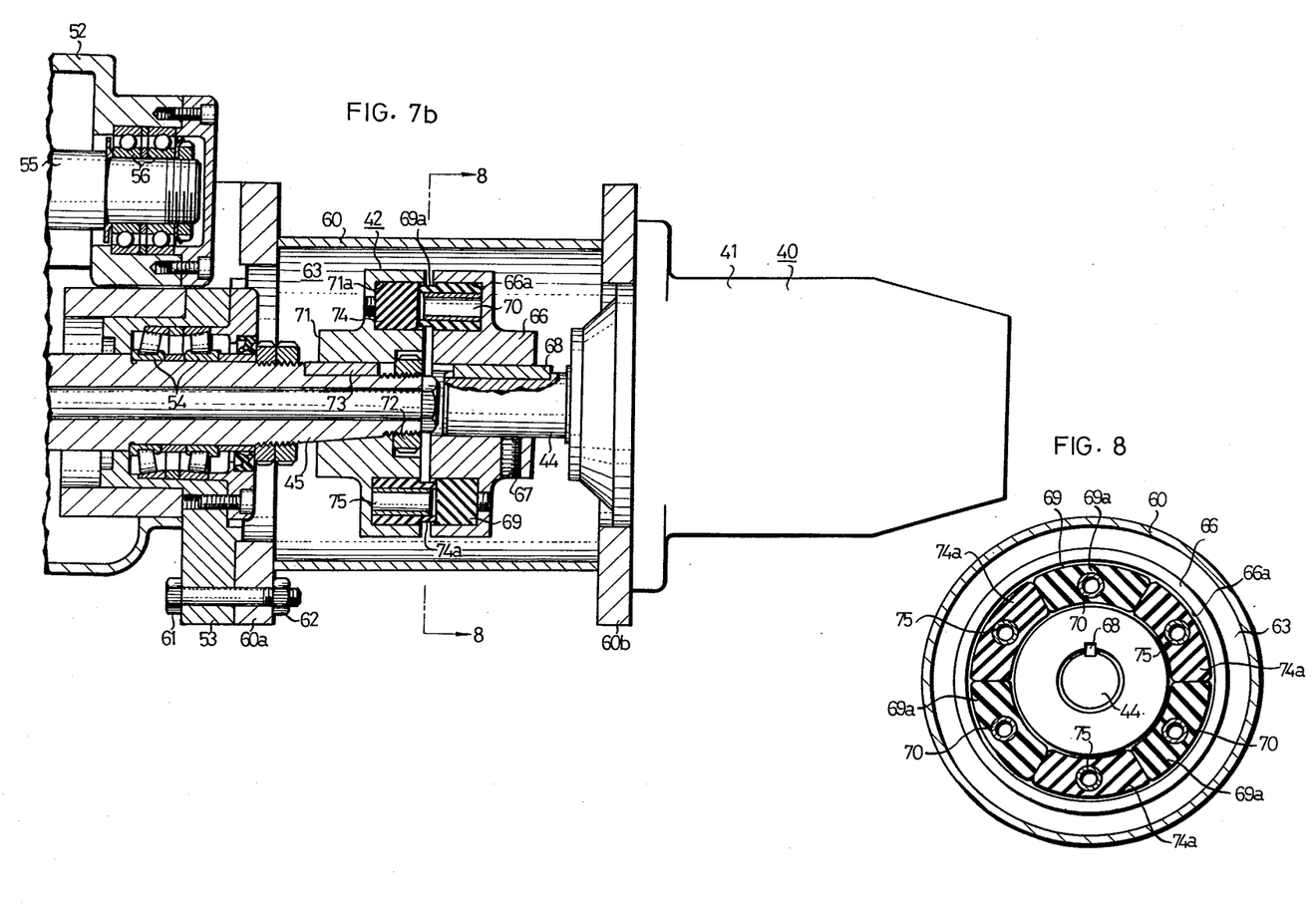
FIG. 8 is a section taken along line 8—8 in FIG. 7b.

The construction of the drive means 40 for driving the hob 43 will now be described in detail with reference to FIGS. 6 to 8. The hob head 52 is supported on the side face of the column via the hob saddle such that it is movable in the vertical direction and also rotatable. The hob shaft 45 extends in the longitudinal direction of the hob head 52 and penetrates the head. It is rotatably supported in bearings 54 in a bearing retainer 53 provided at the rear end of the hob head 52. As is clearly shown in FIGS. 6 and 7a, the hob 43 is fittedly supported on the hob shaft 45 near the front end thereof for hobbing a workpiece supported on the table of the hobbing machine. Within the hob head 52 part of the transmission gear means 47 for transmitting power for feeding is provided. More particularly, a transmission shaft 55 is rotatably supported in a plurality of bearings 56 such that it extends parallel to the hob shaft 45, and the hob shaft 45 and transmission shaft 55 have respective integral spur gears 57 and 58 meshing with each other. The transmission shaft 55 has a bevel gear 59 secured to its front end and in mesh with a bevel gear provided within the hob saddle for transmitting power for feeding. A cylindrical casing 60, which is provided at its front end with a flange 60a secured by a plurality of bolts 61 and nuts 62 to the rear side of the bearing retainer 53, defines a coupling chamber 63 accommodating a rear end portion of the hob shaft 45. The oil pressure motor 41 is secured by a plurality of bolts 64 and nuts 65 to the rear side of a rear end flange 60b of the casing 60, and its motor shaft 44 extends coaxially with the hob shaft 45 from the front end of the motor 41 up to the vicinity of the rear end of the hob shaft 45.

The coupling 42 is provided within the coupling chamber 63 and between the opposing end portions of the motor shaft 44 and hob shaft 45. The coupling includes a drive coupling member 66 and a driven coupling member 71. the drive coupling member 66 is secured by a screw 67 to the front end of the motor shaft 44 and keyed thereto with a key 67, and it has an annular groove 66a formed on its front side. Accommodated in and secured to the annular groove 66a is an annular buffer member 69, which is made of a comparatively hard resilient material such as urethane rubber and provided with a plurality of uniformly spaced, frontwardly protruding engagement portions 69a. A cylindrical reinforcing member 70 is embedded in a central portion of each engagement portion 69a to prevent the bending thereof. The driven coupling member 71 is secured by a nut 72 to the rear end of the hob shaft 45 and keyed thereto with a key 73, and it has an annular groove 71a formed on its rear side. Accommodated in and secured to the annular groove 71a is an annular buffer member 74, which, like the buffer member 69 on the side of the drive coupling member 66, is made of a comparatively hard resilient material such as urethane rubber and provided with a plurality of uniformly spaced, rearwardly protruding engagement portions 74a engaging with the engagement portions 69a of the drive side buffer member 69. Similar to the drive side buffer member, a cylindrical reinforcing member 75 is embedded in a central portion of each engagement portion 74a to prevent the bending thereof.

Thus, the motor shaft 44 and hob shaft 45 are coupled together in a manner capable of shock absorption with the engagement between the engagement portions 69a and 74a of both the buffer members 69 and 74. The rotation of the coil pressure motor 41 is thus transmitted from the motor shaft 44 through the coupling 42 to the hob shaft 45 to directly drive the hob 43 provided on the hob shaft 45 near the front end thereof. In this way, rotational vibrations of the hob shaft 45 are substantially eliminated to eliminate the breakage or wear of the hob 43 that might otherwise result from such vibrations, thus ensuring accurate hobbing of the workpiece. Also, if a great cutting force is applied to the hob 43 during the hobbing operation, particularly at the instant of start of depth feeding for forming a given tooth in the workpiece, the function of shock absorption is achieved in the oil motor 41 itself and also between the engagement portions 69a and 74a of the buffer members 69 and 74, thus preventing the cutting blade from striking the workpiece and being broken.

Further, since both the buffer members 69 and 74 are made of a comparatively hard resilient material such as urethane rubber as mentioned earlier, after absorption of shock on the hob 43 with slight elastic deformation of both the engagement portions 69a and 74a as in the aforementioned case large power can be accurately transmitted from the oil pressure motor 41 to the hob 43 without irregular twisting between the motor shaft 44 and hob shaft 45 or loss of power, so that it is possible to cut a gear of a large module quietly and with high precision. In this viewpoint, the coupling 42 coupling the motor shaft 44 and hob shaft 45 to each other is desirably of such nature as to behave like a rigid body immediately after absorption of shock load at the start of cutting of the workpiece with elastic deformation.

This is because excessive elastic deformation has the same effect of great twisting of the hob shaft 45 and leads to such undesired results as formation of triangular notch in the tooth surface. In order for the buffer members 69 and 74 to be able to undergo slight elastic deformation and offer strong resistance against great deformation, it is necessary to increase the hardness of rubber used and reduce the ability of volume change as much as possible as in the following examples.

Figure 9:
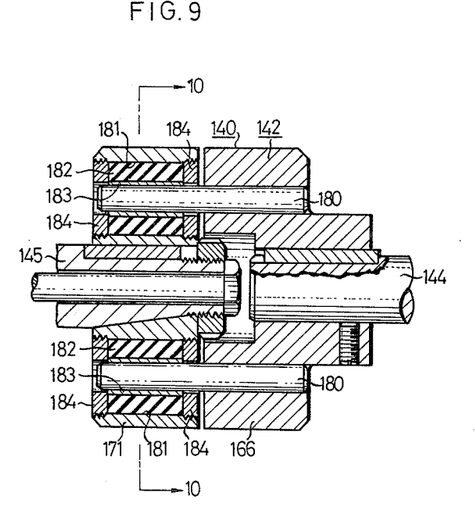
FIG. 9 is a sectional view showing a different example of the coupling in the hobbing machine according to the invention.
Figure 10:
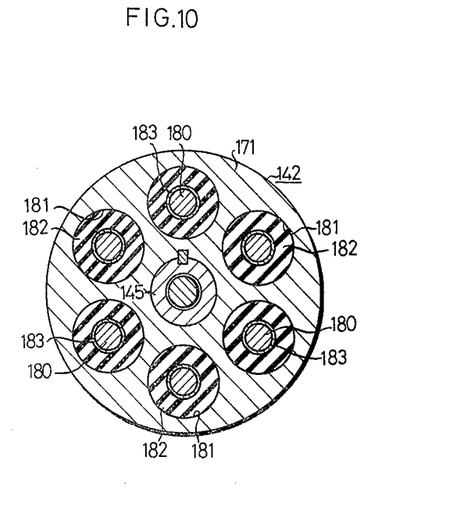
FIG. 10 is a section taken along line 10—10 in FIG. 9.

FIGS. 9 and 10 show a different example of the drive means. Similar to the preceding example, coupling 142 in this drive means 140 includes a drive coupling member 166 secured to the front end of motor shaft 144 and a driven coupling member 171 secured to the rear end of hob shaft 145. In this example, the drive coupling member 166 is provided with a plurality of connecting rods 180 extending from its front side and radially arranged at a uniform spacing, while the driven coupling member 171 is provided with receiving holes 181 individually receiving the respective connecting rods 180. Accommodated in each receiving hole 181 is a cylindrical buffer member 182, which is made of a comparatively hard resilient material such as urethane rubber as the buffer members in the previous example. The buffer member 182 here surrounds the associated connecting rod 180 via a sleeve 183. The opposite ends of the buffer member 182 engage respective lock members 184 screwed into the receiving hole 181 at the opposite ends thereof. Each connecting rod 180 is inserted into the associated sleeve 183 within the associated buffer member 182. In this way, the motor shaft 144 and hob shaft 145 are coupled together in a manner capable of shock absorption. Thus, similar to the first-mentioned example variations of the cutting force applied to the cutting blade of the hob during the hobbing of a workpiece are absorbed by the buffer members 182 to prevent the breakage of the cutter blade. Also, since in this example each buffer member 182 engages at its opposite ends with the respective lock members 184, the elastic deformation factor of the buffer member 182 is restricted only to a slight gas due to dimensional errors of the buffer member. Thus, after slight elastic deformation to absorb shock on the hob the buffer members 182 behave like a rigid body to permit accurate transmission of large power from the oil pressure motor to the hob without causing irregular twisting between the motor shaft and hob shaft 145 or loss of power, thus permitting hobbing with high precision.

Figure 11:
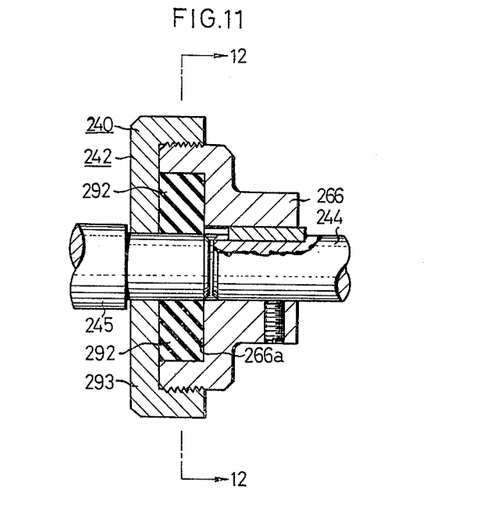
FIG. 11 is a sectional view showing a further example of the coupling in the hobbing machine according to the invention.
Figure 12:
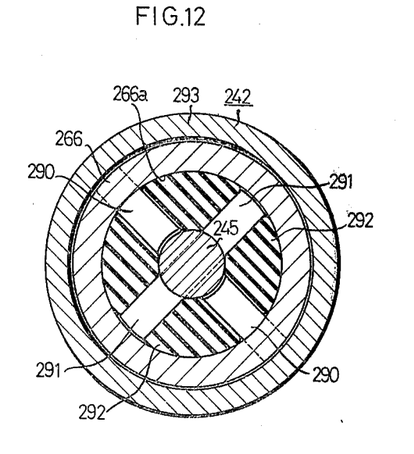
FIG. 12 is a section taken along line 12—12 in FIG. 11.

FIGS. 11 and 12 show a further example of the drive means. Coupling 242 in this drive means 240 consists of a drive coupling member 266, which is secured to the front end of motor shaft 244 and is formed on its front side with a circular groove 266a. A pair of diametrically opposite coupling pieces 290 extend from the inner periphery of the circular groove 266a toward the center thereof. Also extending within the circular groove 266a are another pair of diametrically opposite coupling pieces 291 which extend radially outwardly from the rear end of hob shaft 245. Buffer members 292 of a comparatively hard resilient material such as urethane rubber as the buffer members in the preceding two examples are provided in the space within the circular groove 266a and between adjacent coupling pieces 290 and 291. The outer surface of the buffer members 292 engages a closure member 293 screwedly secured to the drive coupling member 266. Thus, similar to the preceding two examples variations of the cutting force applied to the cutting blade of the hob during the hobbing of a workpiece are absorbed by the buffer members 292 to prevent the breakage of the cutter blade. Also, since in this example the buffer members 292 provided within the circular groove 266a in the drive coupling member 266 are held in a restricted state by the closure members 293, after slight elastic deformation to absorb shock on the hob the buffer members 292 behave like a rigid body to permit accurate transmission of large power from the oil pressure motor to the hob without causing irregular twisting between the motor shaft 244 and hob shaft 245 or loss of power, thus permitting hobbing with high precision.

As has been shown in the foregoing, according to the invention it is possible to provide an excellent hobbing machine, which permits the production of a number of gears with the same hob and without breakage or wear of the cutting blade of the hob and also permits the hobbing of gears of large modules free from bending of face quietly and with high precision.

The foregoing embodiments are by no means limitative, but changes and modifications, for instance in the construction of the coupling, are possible without departing from the scope of the invention as set forth in the claims. Further, satisfactory effects may as well be expected when the technical concept underlying invention is applied to various other machine tools than the hobbing machine, for instance milling machine, rack cutting machine, horizontal boring machine, etc.

I claim:
1. In a hobbing machine having:
   a. a tool support member (22) operably provided on a machine frame and having a tool support shaft (24);
   b. a workpiece support member (26) operably supported on said machine frame and serving to support a workpiece;
   c. a tool (43) provided on said tool support shaft and serving to cut the outer periphery of the workpiece;
   d. a fluid drive pressure motor provided on said tool support member in the neighborhood of said tool and having a motor shaft (44) extending coaxially with said tool support shaft;
   e. a coupling (42) provided between said motor shaft (44) and tool support shaft (24) for directly driving said tool (43) and having means providing an effect of shock absorption, said means including:
   f. a drive coupling member (66) secured on the end portion of the motor shaft and having an annular groove (66a);
   g. a resilient annular buffer member (69) disposed in the annular groove and having a plurality of uniformly spaced drive projections (69a);
   h. a driven coupling member (71) secured on the end portion of the tool support shaft (45) and having an annular groove (71a); and,
   i. an annular buffer member (74) disposed in the annular groove (71a) of the driven coupling member and having a plurality of uniformly spaced driven projections (74a) engage with the drive projections.

2. A hobbing machine as claimed in claim 1, wherein said buffer members are made of a comparatively hard resilient material as urethane rubber.

3. A hobbing machine as claimed in claim 1, wherein said buffer members have a plurality of reinforcing members in a central portion of each projection.

4. A hobbing machine having:

a. a tool support member (22) operably provided on a machine frame and having a tool support shaft (24);

b. a workpiece support member (26) operably supported on said machine frame and serving to support a workpiece;

c. a tool (43) provided on said tool support shaft and serving to cut the outer periphery of the workpiece;

d. a fluid drive pressure motor provided on said tool support member in the neighborhood of said tool and having a motor shaft (144) extending coaxially with said tool support shaft;

e. a coupling (142) provided between said motor shaft (144) and tool support shaft (24) for directly driving said tool (43) and having means providing an effect of shock absorption, said means including:

f. a pair of drive and driven coupling members (166, 171) secured on the end portions of the motor shaft and tool support shaft;

g. receiving chambers formed in the one of said coupling members;

h. a plurality of resilient buffer members (182) disposed in said receiving chambers to engage with a plurality of engage portions provided on the other of said coupling members; and, i. lock means (184) for closing said receiving chambers to support buffer members in a restricted state such that their shape will not be substantially changed.

5. A hobbing machine as claimed in claim 4, wherein said receiving chambers are formed in the coupling member to extend in parallel with the motor shaft and said engage portions are arranged coaxially with each receiving chamber to embed in buffer members.

6. A hobbing machine as claimed in claim 4, wherein said engage portions extend radially from the axis of the motor shaft to embed between buffer members.

* * * * *